US011519050B2

(12) United States Patent
Palzer et al.

(10) Patent No.: US 11,519,050 B2
(45) Date of Patent: Dec. 6, 2022

(54) METHOD FOR PRODUCING A RE-SHAPED COMPONENT FROM A MANGANESE-CONTAINING FLAT STEEL PRODUCT AND SUCH A COMPONENT

(71) Applicant: Salzgitter Flachstahl GmbH, Salzgitter (DE)

(72) Inventors: Peter Palzer, Liebenburg (DE); Thomas Evertz, Peine (DE); Manuel Otto, Cremlingen (DE); Kai Köhler, Nordstemmen (DE)

(73) Assignee: SALZGITTER FLACHSTAHL GMBH, Salzgitter (DE)

( * ) Notice: Subject to any disclaimer, the term of this patent is extended or adjusted under 35 U.S.C. 154(b) by 324 days.

(21) Appl. No.: 16/333,934

(22) PCT Filed: Aug. 16, 2017

(86) PCT No.: PCT/EP2017/070777
§ 371 (c)(1),
(2) Date: Mar. 15, 2019

(87) PCT Pub. No.: WO2018/050387
PCT Pub. Date: Mar. 22, 2018

(65) Prior Publication Data
US 2019/0211417 A1   Jul. 11, 2019

(30) Foreign Application Priority Data
Sep. 16, 2016 (DE) .................. 10 2016 117 507.2

(51) Int. Cl.
| | |
|---|---|
| *C21D 9/08* | (2006.01) |
| *C22C 38/02* | (2006.01) |
| *C22C 38/06* | (2006.01) |
| *C21D 8/02* | (2006.01) |
| *C22C 38/04* | (2006.01) |
| *C21D 6/00* | (2006.01) |
| *C21D 8/10* | (2006.01) |
| *C22C 38/00* | (2006.01) |
| *C22C 38/20* | (2006.01) |
| *C22C 38/22* | (2006.01) |
| *C22C 38/24* | (2006.01) |
| *C22C 38/26* | (2006.01) |
| *C22C 38/28* | (2006.01) |
| *C22C 38/30* | (2006.01) |
| *C22C 38/32* | (2006.01) |
| *C22C 38/38* | (2006.01) |
| *F16L 9/02* | (2006.01) |

(52) U.S. Cl.
CPC ............ *C21D 9/085* (2013.01); *C21D 6/002* (2013.01); *C21D 6/005* (2013.01); *C21D 6/008* (2013.01); *C21D 8/0205* (2013.01); *C21D 8/0221* (2013.01); *C21D 8/105* (2013.01); *C22C 38/001* (2013.01); *C22C 38/002* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/38* (2013.01); *F16L 9/02* (2013.01); *C21D 2211/001* (2013.01); *C21D 2211/008* (2013.01)

(58) Field of Classification Search
CPC ........ C21D 2211/001; C21D 2211/008; C21D 6/002; C21D 6/005; C21D 6/008; C21D 8/0205; C21D 8/0221; C21D 8/105; C21D 9/085
See application file for complete search history.

(56) References Cited

U.S. PATENT DOCUMENTS

| | | | |
|---|---|---|---|
| 3,752,709 A | 8/1973 | Zackey | |
| 2015/0337408 A1 | 11/2015 | Schulz | |
| 2016/0122839 A1* | 5/2016 | Evertz ...................... | C21D 7/10 |
| | | | 148/578 |
| 2016/0258035 A1* | 9/2016 | Gomez .................... | C21D 1/18 |

(Continued)

FOREIGN PATENT DOCUMENTS

| | | |
|---|---|---|
| DE | 102008014213 | 9/2009 |
| DE | 102012013113 | 12/2013 |

(Continued)

OTHER PUBLICATIONS

Google patents translation DE 102012111959 (Year: 2012).*
Google patents translation DE 102013104298 (Year: 2013).*
Google patents translation DE 102008014213 (Year: 2008).*
Guthrie, R.I.L. et al. "Steel processing technology". ASM Handbook vol. 1. 1990. p. 107-125. (Year: 1990).*
Srivastava, B. et al. "A review on effect of preheating and/or post weld heat treatment on mechanical behavior of ferrous metals." International journal of engineering science and technology. 2. 2010. p. 625-631. (Year: 2010).*
Russian Search Report dated Nov. 28, 2019 with respect to counterpart Russian patent application 2019107477/02(014540).

(Continued)

*Primary Examiner* — Nicholas A Wang
(74) *Attorney, Agent, or Firm* — Henry M. Feiereisen LLC

(57) ABSTRACT

The invention relates to a method for producing a component from a medium manganese flat steel product having 4 to less than 10 wt. % Mn, 0.0005 to 0.9 wt. % C, 0.02 to 10 wt. % Al, the remainder iron, including unavoidable steel-accompanying elements, and having a TRIP effect at room temperature. In order to produce a component, which is distinguished by very high strengths and an increased residual strain and re-shaping capacity, the flat steel product, according to the invention, is re-shaped by at least one re-shaping step to form a component and, before and/or during and/or after the at least one re-shaping step, the flat steel product is cooled down to a temperature of the flat steel product of less than room temperature to −196° C. The invention further relates to a component produced by this method and to a use for said components.

10 Claims, No Drawings

(56) References Cited

U.S. PATENT DOCUMENTS

2016/0281196 A1* 9/2016 Huang ................... C22C 38/06
2017/0306429 A1* 10/2017 Kurnsteiner ........... C21D 1/185

FOREIGN PATENT DOCUMENTS

| DE | 102012111959 | | 6/2014 |
|----|----|----|----|
| DE | 102013104298 | | 10/2014 |
| DE | WO2014180456 | * | 11/2014 |
| EP | 2 383 353 | | 11/2011 |
| KR | 2005 0042513 | | 5/2005 |
| KR | 10-2016-0003744 | | 1/2016 |
| RU | 117268 A | | 6/1958 |
| RU | 2365633 C1 | | 8/2009 |
| RU | 2394922 | | 7/2010 |
| WO | WO 2016/131218 | | 8/2016 |
| WO | WO 2016131218 A1 | | 8/2016 |

OTHER PUBLICATIONS

Translation of Russian Search Report dated Nov. 28, 2019 with respect to counterpart Russian patent application 2019107477/02(014540).

International Search Report issued by the European Patent Office in International Application PCT/EP2017/070777 dated Oct. 20, 2017.

* cited by examiner

US 11,519,050 B2

METHOD FOR PRODUCING A RE-SHAPED COMPONENT FROM A MANGANESE-CONTAINING FLAT STEEL PRODUCT AND SUCH A COMPONENT

CROSS-REFERENCES TO RELATED APPLICATIONS

This application is the U.S. National Stage of International Application No. PCT/EP2017/070777, filed Aug. 16, 2017, which designated the United States and has been published as International Publication No. WO 2018/050387 and which claims the priority of German Patent Application, Serial No. 10 2016 117 507.2, filed Sep. 16, 2016, pursuant to 35 U.S.C. 119(a)-(d).

BACKGROUND OF THE INVENTION

The invention relates to a method for producing a component consisting of a medium manganese flat steel product comprising 4 to less than 10 wt. % Mn, 0.0005 to 0.9 wt. % C, 0.02 to 10 wt. % Al, with the remainder being iron including unavoidable steel-associated elements and with a TRIP effect at room temperature. The invention also relates to a component produced by this method and a use for these components.

European patent application EP 2 383 353 A2 discloses a flat steel product consisting of a manganese steel which consists of the following elements (contents in weight percent in relation to the steel melt): C: to 0.5; Mn: 4 to 12.,0; Si: up to 1.0; Al: up to 3.0; Cr: 0.1 to 4.0; Cu: up to 4.0; Ni: up to 2.0; N: up to 0.05; P: up to 0.05; S: up to 0.01, with the remainder being iron and unavoidable impurities. Optionally, one or more elements from the group "V, Nb, Ti" are provided, wherein the sum of the contents of these elements is at most equal to 0.5. This steel is said to be characterised in that it can be produced in a more cost-effective manner than high manganese steels and at the same time has high elongation at fracture values and, associated therewith, a considerably improved deformability. After quenching of the flat steel product in oil or water at room temperature, the flat steel product has a tensile strength of 900 to 1500 MPa at an elongation at fracture A80 of at least 4%.

German laid-open document DE 10 2012 111 959 A1 describes a method for producing a motor vehicle component. For this purpose, a steel having TWIP properties at room temperature, a high manganese content of 10 to 30 wt. %, a maximum aluminium content of 8 wt. % and a maximum carbon content of 2 wt. % is preferably used. In the method, a steel sheet plate is tempered at least partially to a cold forming temperature of +30° C. to −250° C. Subsequently, the steel sheet plate is formed into the motor vehicle component at the cold forming temperature, whereby martensite formation is at least partially induced.

Also, German laid-open document DE 10 2012 013 113 A1 already describes so-called TRIP steels which have a predominantly ferritic basic microstructure having incorporated residual austenite which can convert into martensite during deformation (TRIP effect). Owing to its intense cold-hardening, the TRIP steel achieves high values for uniform elongation and tensile strength. TRIP steels are suitable for use inter alia in structural components, chassis components and crash-relevant components of vehicles, as sheet metal blanks and as tailored welded blanks.

Furthermore, German patent DE 10 2013 104 298 B4 describes roll profiling, also referred to as roll forming, as a method for deforming medium or high manganese steel strips. Roll forming or roll profiling is a continuous bending method, in which the steel strips are deformed into a desired final shape by a multiplicity of roller pairs step-by-step up to roll profile products. Frequently, a combination of the roll forming with other production methods, such as e.g. punching, longitudinal welding or embossing was used in order to produce virtually any profile shapes even with cross-sections which vary over the component length. In order to achieve a considerable increase in strength by means of roll profiling, at least sections of the steel strip are to be cooled, prior to and/or during the roll profiling, to a maximum temperature of −20° C. or less, e.g. to a temperature of −40° C. to −180° C.

A further known deformation process, the so-called internal high-pressure forming, is described in laid-open document DE 10 2008 014 213 A1 e.g. with the aid of the internal high-pressure forming of pipes. Tubular workpieces are hereby placed into at least two-part tools and are subjected on the inner side to an active medium under a high pressure. The workpiece is hereby expanded, formed into an engraving or geometry of the tool, partially pushed further and thus acquires the shape of the tool. The material must be configured such that a high deformation can also be absorbed locally without material failure.

Proceeding therefrom, the object of the present invention is to provide a method for producing a component consisting of a medium manganese flat steel product, a component produced by this method and a use therefor, which component is characterised by very high strengths with an increased residual elongation and deformation capability.

SUMMARY OF THE INVENTION

In accordance with the invention, the object is achieved by a method for producing a component of a manganese-containing flat steel product comprising 4 to less than 10 wt. % Mn, 0.0005 to 0.9 wt. % C, 0.02 to 10 wt. % Al, with the remainder being iron including unavoidable steel-associated elements and with a TRIP effect at room temperature, the method comprising the steps of:

deforming the flat steel product to form a component by means of a first deforming step cooling the flat steel product prior to and/or during and/or after the at least one deforming step to a temperature of the flat steel product of less than room temperature to −196° C.

A method according to the invention ensures that the component has very high strengths with an increased residual elongation and deformation capability. By lowering the temperature prior to, during or after a preferably final deformation, the TRIP effect is preferred in terms of energy and a larger proportion of the austenite in the medium manganese steel converts into martensite. This deformation in the low temperature range in accordance with the invention is associated with the fact that at the same time the deformation capability and the strength are increased by the TRIP effect. In general, the component is also significantly hardened. The strength is increased during cooling on its own without deformation by means of a temperature-induced conversion of metastable austenite into martensite. The austenite proportion, after supercooling and optional deformation have been performed, is at least 10% lower, in relation to the initial austenite content, than the austenite content at room temperature or a comparable deformation at room temperature. Athermal martensite formation for increasing the strength whilst at the same time decreasing the elongation/toughness is also achieved by means of cooling after deformation.

Advantageous embodiments of the invention are described in the dependent claims.

On the whole, the deformation at the temperatures which are low in accordance with the invention ensures that the TRIP effect is used in a targeted manner in order, at low temperatures below RT, to effect significant hardening and to obtain a higher martensite proportion in the microstructure.

In an advantageous manner, provision is made that the flat steel product is deformed to form a component in at least one deforming step at a temperature of the flat steel product of less than room temperature to −196° C., preferably less than 0 to −196° C. For this purpose, the flat steel product is cooled, prior to at least one deforming step, to a temperature of less than room temperature to −196° C., preferably less than 0° C. to −196° C. Thereafter, cooling of the flat steel product prior to and/or during deformation is preferred. In a particularly preferred manner, by reason of the increase in strength which occurs the deformation at the inventive low temperatures is performed only in one or a plurality of final deforming steps because the deformation capability is reduced by the increase in strength.

In addition and in combination, provision can be made that the flat steel product is deformed to form a component by means of a first or further deforming steps at a temperature of the flat steel product of 60° C. to below Ac3, preferably 60° C. to 450° C. In this case, the flat steel product is pre-heated, prior to the first or further deforming step, to a temperature of 60° C. to below Ac3, preferably to 60° C. to 450° C.

A reduction in the required deformation forces is also associated with the increase in the temperature prior to the first deformation. An increase in the residual deformation capability of the deformed components with tensile strengths of greater than 800 MPa to 2000 MPa at elongations of fracture of greater than 3% is also produced in the regions which are deformed to the greatest extent. The flat steel product can be pre-heated for the coil or the wound strip or panel material. By way of the deformation with pre-heating, in accordance with the invention, of the flat steel product prior to the first deformation step, conversion of the metastable austenite into martensite (TRIP effect) is completely or partially suppressed during the deformation process, wherein deformation twins (TWIP effect) can form in the austenite. The inventive and advantageous reduction in the deformation forces is hereby achieved, and the overall deformation capability is increased.

In a further variant of the method, provision is made that the flat steel product is deformed to form a component by means of further deforming steps at a temperature of the flat steel product of room temperature to below Ac3, preferably room temperature to 450° C. As a result, deformation twins can be introduced in a targeted manner and at room temperature continue to convert into martensite and permit a higher degree of deformation, whereby the energy absorption capability of components is increased.

In conjunction with the present invention, room temperature is defined as lying in the range between 15 to 25° C.

In a particularly advantageous manner, provision is made that the flat steel product is deformed to form a component by means of the further individual deforming steps at different temperatures which in each case can also be locally defined. A targeted and local adjustment of strength and elongation properties of the component can hereby optionally be achieved by varying the deformation temperature.

Therefore, properties are adjusted locally in a targeted manner by cooling or heating. Primarily higher strengths are achieved by means of targeted cooling and higher residual elongations and higher deformation capabilities are achieved by means of local heating.

By virtue of the fact that the cooling is performed only partially, an increase in the strength characteristic values characterised by the yield strength/elasticity limit and/or tensile strength is achieved in specific regions of the component. This corresponds to so-called tailored cooling.

In one variant, provision is made that the flat steel product is cooled and/or pre-heated on one side. As a result, a hard layer can be produced on a ductile component. Alternatively, provision can be made that the flat steel product is pre-heated and/or cooled on both sides. Preferably, provision is made that the flat steel product is cooled on both sides such that a temperature gradient is present over the cross-section of the flat steel product.

In order to maintain the temperature window, in accordance with the invention, for the deformation, the flat steel product can be intermediately heated or intermediately cooed during deformation between the deformation steps to temperatures between −196° C. to below Ac3—depending upon the desired procedure, In a particularly advantageous manner, the method is suitable to deform the flat steel product by means of roll deforming, During the roll deforming, the flat steel product undergoes at least one of creasing, compression, thickness reduction in regions, embossing, punching or channelling or combinations thereof in a multiplicity of successive deformation or processing steps. Components in the form of dosed profiles can also be produced which for this purpose are optionally welded, preferably longitudinal seam welded, after the roll deforming.

The method is also suitable for deforming tubes, which are produced from the flat steel product, by means of internal high-pressure forming which preferably occurs by means of solid, liquid or gaseous active media. In a known manner, the flat steel product, in particular a rolled hot strip or cold strip, is formed for this purpose into a slit tube and then longitudinal seam welded to form a tube or alternatively formed into a spiral and spiral seam welded to form a tube. Preferably but optionally, the tube is then annealed (500 to 850° C., 30 seconds to 12 h) immediately after the longitudinal seam welding or spiral seam welding, e.g. inductively or in the continuous furnace or in a stationary furnace unit, such as e.g. in the hearth furnace or muffle furnace. Alternatively, with a low degree of deformation and sufficient remaining residual ductility for the subsequent internal high-pressure forming, the annealing step can be omitted and thus further processing in the hardened state can be performed. Then, internal high-pressure forming in accordance with the invention is performed at a preferred temperature of 60 to 450° C. Heating is preferably performed via the active medium. Deforming can be preformed in a plurality of steps. After warm internal high-pressure forming, the component preferably still has at least 50% of the initial austenite content. An advantageous temperature range for the internal high-pressure forming is between 60 and 450° C.

In relation to the component obtained via roll deforming or internal high-pressure forming, the following dependencies upon tensile strength Rm in MPa and elongation at fracture A80 in % are produced:

Rm of 700 to 800 MPa: Rm×A80≥15400 up to 50000 MPa %
Rm of over 800 to 900 MPa: Rm×A80≥14400 up to 50000 MPa %
Rm of over 900 to 1100 MPa: Rm×A80≥13500 up to 45000 MPa %
Rm of over 1100 to 1200 MPa: Rm×A80≥13200 up to 45000 MPa %
Rm of over 1200 to 1350 MPa: Rm×80≥11200 up to 45000 MPa %
Rm of over 1350 to 1800 MPa: Rm×A80≥8000 up to 45000 MPa %
Rm of over 1800 MPa: Rm×A80≥7200 up to 30000 MPa %

In a particularly preferred manner, provision is made that the flat steel product is produced with the following chemical composition (in wt. %) in order to achieve in particular the described advantages:
C: 0.0005 to 0.9, preferably 0.05 to 0.35
Mn: 4 to less than 10, preferably greater than 5 to less than 10
Al: 0.02 to 10, preferably 0.05 to 5, particularly preferred greater than 0.5 to 3
with the remainder being iron including unavoidable steel-associated elements,
with optional addition by alloying of:
Si: 0 to 6, preferably 0.05 to 3, in a particularly preferred manner 0.1 to 1.5
Cr: 0 to 6, preferably 0.1 to 4, particularly preferred greater than 0.5 to 2.5
Nb: 0 to 1, preferably 0.005 to 0.4, particularly preferred 0.01 to 0.1
V: 0 to 1.5, preferably 0.005 to 0.6, particularly preferred 0.01 to 0.3
Ti: 0 to 1.5, preferably 0.005 to 0.6, particularly preferred 0.01 to 0.3
Mo: 0 to 3, preferably 0.005 to 1.5, particularly preferred 0.01 to 0.6
Sn: 0 to 0.5, preferably less than 0.2, particularly preferred less than 0.05
Cu: 0 to 3, preferably less than 0.5, particularly preferred less than 0.1
W: 0 to 5, preferably 0.01 to 3, particularly preferred 0.2 to 1.5
Co: 0 to 8, preferably 0.01 to 5, particularly preferred 0.3 to 2
Zr: 0 to 0.5, preferably 0.005 to 0.3, particularly preferred 0.01 to 0.2
Ta: 0 to 0.5, preferably 0.005 to 0.3, particularly preferred 0.01 to 0.1
Te: 0 to 0.5, preferably 0.005 to 0.3, particularly preferred 0.01 to 0.1
B: 0 to 0.15, preferably 0.001 to 0.08, particularly preferred manner 0.002 to 0.01
P: less than 0.1, preferably less than 0.04
S: less than 0.1, preferably less than 0.02
N: less than 0.1, preferably less than 0.05.

This flat steel product consisting of the medium manganese TRIP (TRansformation Induced Plasticity) and/or TWIP (TWinning Induced Plasticity) steel has excellent cold-formability and warm-formability, increased resistance to hydrogen-induced delayed crack formation (delayed fracture), to hydrogen embrittlement after deformation and to liquid metal embrittlement (LME) during welding, In a conventional manner, the previously described flat steel product is produced by a production route described hereinafter:

melting and alloying a steel melt with the above-described chemical composition in a, via the process route, blast furnace steel plant or electric arc furnace steel plant with optional vacuum treatment of the melt;

casting the steel melt to form a pre-strip by means of a horizontal or vertical strip casting process approximating the final dimensions or casting the steel melt to form a slab or thin slab by means of a horizontal or vertical slab or thin slab casting process, heating the pre-strip to a rolling temperature of 1050 to 1250° C. or in-line rolling out of the casting heat (first heat), hot rolling the pre-strip or the slab or the thin slab to form a hot strip having a thickness of 20 to 0.8 mm at a final rolling temperature of 1050 to 800° C., reeling the hot strip at a temperature of more than 100 to 800° C., acid-cleaning the hot strip, annealing the hot strip in a continuous annealing installation or batch-type—or discontinuous—annealing installation for an annealing time of 1 min to 24 h and at temperatures of 500 to 840° C., optionally cold rolling the hot strip at room temperature, preferably with pre-heating to 60 to below Ac3 temperature, preferably 60 to 450° C. prior to the first rolling pass to reduce the rolling forces and form deformation twins in the austenite and, as required, cooling or heating between the rolling passes to 60° C. to below the Ac3 temperature, preferably 60 to 450° C., optionally annealing at 500 to 840° C. for 1 min to 24 h in a continuous annealing installation or batch-type—or discontinuous—annealing installation, optionally electrolytically galvanising or hot-dip galvanising the steel strip or applying another organic or inorganic coating.

Then, the flat steel product is deformed in accordance with the invention into a component.

The flat steel product produced by this production route has a microstructure with an austenite content of 10 to 80%, 20 to 90% martensite, ferrite and bainite, wherein at least 30% of the martensite is present as annealed martensite. Preferably, the microstructure has 40 to 80% austenite, less than 20% ferrite/bainite, with the rest being martensite.

Typical thickness ranges for the pre-strip are 1 mm to 35 mm and for slabs and thin slabs they are 35 mm to 450 mm. Provision is preferably made that the slab or thin slab is hot rolled to form a hot strip having a thickness of 20 mm to 0.8 mm or the pre-strip, cast to approximately the final dimensions, is hot rolled to form a hot strip having a thickness of 8 mm to 0.8 mm. The cold strip has a thickness of typically less than 3 mm, preferably 0.1 to 1.4 mm.

In the context of the above method in accordance with the invention, a pre-strip produced with the two-roller casting process and approximating the final dimensions and having a thickness of less than or equal to 3 mm, preferably 1 mm to 3 mm is already understood to be a hot strip. The pre-strip thus produced as a hot strip does not have a cast structure owing to the introduced deformation of the two rollers running in opposite directions. Hot rolling thus already takes place in-line during the two-roller casting process which means that separate heating and hot rolling is not necessary.

The cold rolling of the hot strip can take place at room temperature or advantageously at elevated temperature with one heating process prior to the first rolling pass and/or with heating processes in a subsequent rolling pass or between several rolling passes. The cold rolling at elevated temperature is advantageous in order to reduce the rolling forces and to aid the formation of deformation twins (TWIP effect).

Advantageous temperatures of the material being rolled prior to the first rolling pass are 60° C. to below Ac3 temperature, preferably 60 to 450° C.

If the cold rolling is performed in a plurality of rolling passes, it is advantageous to intermediately heat or cool the steel strip between the rolling passes to a temperature of 60° C. to below Ac3 temperature, preferably 60° C. to 450° C. because the TWIP effect is brought to bear in a particularly advantageous manner in this range. Depending upon the rolling speed and degree of deformation, intermediate heating, e.g. at very low degrees of deformation and rolling speeds, and also additional cooling, caused by heating the material with rapid rolling and high degrees of deformation, can be performed.

After cold rolling of the hot strip at room temperature, the steel strip is to be annealed in a continuous annealing installation or batch-type—or other discontinuous—annealing installation advantageously for an annealing time of 1 min to 24 h, preferably less than 10 min, and at temperatures of 500 to 840° C., in order to restore sufficient forming properties. If required in order to achieve specific material properties, this annealing procedure can also be performed with the steel strip rolled at elevated temperature.

After the annealing treatment, the steel strip is advantageously cooled to a temperature of 250° C. to room temperature and subsequently, if required, in order to adjust the required mechanical properties, in the course of ageing treatment, is reheated to a temperature of 300 to 450° C., is maintained at this temperature for up to 5 min and subsequently is cooled to room temperature. The ageing treatment can be performed advantageously in a continuous annealing installation.

The flat steel product produced in this manner can optionally be electrolytically galvanised or hot-dip galvanised. In one advantageous development, the steel strip produced in this manner acquires a coating on an organic or inorganic basis instead of or after the electrolytic galvanising or hot-dip galvanising. They can be e.g. organic coatings, synthetic material coatings or lacquers or other inorganic coatings, such as e.g. iron oxide layers.

In accordance with the invention, a deformed component can be produced by the above-described method. The component which is preferably deformed at elevated temperature has, with the same degree of deformation, at least the same or higher strength properties (yield strength/elasticity limit and/or tensile strength) as/than a component deformed at room temperature, wherein the elongation at fracture is at least 10% higher in comparison with the deformation at room temperature. In a similar manner, it is possible to set comparable characteristic values for the elongation at fracture, wherein the characteristic value for the strength (yield strength/elasticity limit and/or tensile strength) is, in comparison, 10% above the characteristic values of deformation at room temperature. The warm-formed component has an increased resistance to hydrogen-induced embrittlement and delayed crack formation because the TRIP effect is at least partially suppressed. Also, liquid metal embrittlement does not occur during welding.

The invention renders it possible to produce a high-strength component which has a residual elongation and/or residual toughness considerably improved in comparison with low-alloyed steels of the same strength class and is considerably more cost-effective in comparison with high manganese steels which have alloy contents >=10 wt. % Mn and/or high-Cr-alloyed and/or Cr-Ni or other high-alloyed steels currently used for such applications, In accordance with the invention, a use of a component produced by the previously described method is advantageously provided in the automotive industry, rail vehicle construction, shipbuilding, plant design, infrastructure, the aerospace industry, household appliances and in tailored welded blanks.

A steel strip produced according to the method in accordance with the invention advantageously has an elasticity limit $R_{p0.2}$ of 300 to 1350 MPa, a tensile strength $R_m$ of 1100 to 2200 MPa and an elongation at fracture $A_{80}$ of more than 4 to 41%, wherein high strengths tend to be associated with lower elongations at fracture and vice versa:

$R_m$ of 700 to 800 MPa: $R_m \times A_{80} \geq 15400$ up to 50000 MPa %

$R_m$ of over 800 to 900 MPa: $R_m \times A_{80} \geq 14400$ up to 50000 MPa %

$R_m$ of over 900 to 1100 MPa: $R_m \times A_{80} \geq 13500$ up to 45000 MPa %

$R_m$ of over 1100 to 1200 MPa: $R_m \times A_{80} \geq 13200$ up to 45000 MPa %

$R_m$ of over 1200 to 1350 MPa: $R_m \times A_{80} \geq 11200$ up to 45000 MPa %

$R_m$ of over 1350 to 1800 MPa: $R_m \times A_{80} \geq 8000$ up to 45000 MPa %

$R_m$ of over 1800 MPa: $R_m \times A_{80} \geq 7200$ up to 30000 MPa %

The test piece type 2 having an initial measuring length of $A_{80}$ was used for the elongation at fracture tests as per DIN 50 125.

The use of the term to in the definitions of the content ranges, such as e.g. 0.01 to 1 wt. %, means that the limit values—0.01 and 1 in the example—are also included.

Alloy elements are generally added to the steel in order to influence specific properties in a targeted manner. An alloy element can thereby influence different properties in different steels. The effect and interaction generally depend greatly upon the quantity, presence of further alloy elements and the solution state in the material. The correlations are varied and complex. The effect of the alloy elements in the alloy in accordance with the invention will be discussed in greater detail hereinafter. The positive effects of the alloy elements used in accordance with the invention will be described hereinafter.

Carbon C: is required to form carbides, stabilises the austenite and increases the strength. Higher contents of C impair the welding properties and result in the impairment of the elongation and toughness properties, for which reason a maximum content of 0.9 wt. %, preferably 0.35 wt. %, is set. In order to achieve the desired combination of strength and elongation properties of the material, a minimum addition of 0.0005 wt. %, preferably 0.05 wt. %, is necessary.

Manganese Mn: stabilises the austenite, increases the strength and the toughness and renders possible a deformation-induced martensite formation and/or twinning in the alloy in accordance with the invention. Contents of less than 4 wt. % are not sufficient to stabilise the austenite and thus impair the elongation properties, whereas with contents of more than 10 wt. % and more the austenite is stabilised too much and as a result the strength properties, in particular the 0.2% elasticity limit, are reduced. For the manganese steel in accordance with the invention having medium manganese contents, a range of 4 to less than 10 wt. %, preferably greater than 5 to 10, is preferred.

Aluminium Al: Al improves the strength and elongation properties, decreases the relative density and influences the conversion behaviour of the alloy in accordance with the invention. Excessively high contents of Al impair the elongation properties. Higher Al contents also considerably impair the casting behaviour in the continuous casting process. This produces increased outlay when casting. High Al contents delay the precipitation of carbides in the alloy in accordance with the invention. Therefore, an Al content of 0.02 to 10 wt. %, preferably 0.05 to 5 wt. %, in a particularly preferred manner greater than 0.5 to 3 wt. %, is set, Silicon Si: the optional addition of Si in higher contents impedes the diffusion of carbon, reduces the relative density and increases the strength and elongation properties and toughness properties. Furthermore, an improvement in the cold-rollability could be seen by adding Si by alloying. Higher Si contents result in embrittlement of the material and negatively influence the hot- and cold-rollability and the coatability e.g. by galvanising. Therefore, an Si content of 0 to 6 wt. %, preferably 0.05 to 3 wt. %, in a particularly preferred manner 0.1 to 1.5 wt. %, is set.

Chromium Cr: the optional addition of Cr improves the strength and reduces the rate of corrosion, delays the formation of fen Re and perlite and forms carbides. Higher contents result in impairment of the elongation properties. Therefore, a Cr content of 0 to 6 wt. %, preferably 0.1 to 4 wt. %, in a particularly preferred manner greater than 0.5 to 2.5 wt. %, is set.

Microalloy elements are generally added only in very small amounts. In contrast to the alloy elements, they mainly act by precipitate formation but can also influence the properties in the dissolved state. Small added amounts of the microalloy elements already considerably influence the processing properties and final properties. Particularly in the case of hot-forming, microalloy elements advantageously influence the recrystallisation behaviour and effect grain refinement, Typical microalloy elements are vanadium, niobium and titanium. These elements can be dissolved in the iron lattice and form carbides, nitrides and carbonitrides with carbon and nitrogen.

Vanadium V and niobium Nb: these act in a grain-refining manner in particular by forming carbides, whereby at the same time the strength, toughness and elongation properties are improved. Contents of more than 1.5 wt. % or 1 wt. % do not provide any further advantages. For vanadium and niobium, a minimum content of 0.005 wt. % and a maximum content of 0.6 wt. % or 0.4 wt. % are optionally preferred, with a minimum content of 0.01 wt. % and a maximum content of 0.3 wt. % or 0.1 wt. % being particularly preferred.

Titanium Ti: acts in a grain-refining manner as a carbide-forming agent, whereby at the same time the strength, toughness and elongation properties are improved, and reduces the inter-crystalline corrosion. Contents of Ti of more than 1.5 wt. % impair the elongation properties, for which reason a maximum content of 1.5 wt. %, preferably 0.6 wt. %, in a particularly preferred manner 0.3 wt. %, is optionally set. Minimum contents of 0.005 wt. %, preferably 0.01 wt. %, can be provided in order to bind nitrogen and advantageously precipitate Ti.

Molybdenum Mo: acts as a carbide-forming agent, increases the strength and increases the resistance to delayed crack formation and hydrogen embrittlement. High contents of Mo impair the elongation properties. Therefore, an Mo content of 0 to 3 wt. %, preferably 0.005 to 1.5 wt. %, in a particularly preferred manner greater than 0.01 to 0.6 wt. %, is optionally set.

Tin Sn: tin increases the strength but, similar to copper, accumulates beneath the scale layer and at the grain boundaries at higher temperatures. This results, owing to the penetration into the grain boundaries, in the formation of lows melting phases and, associated therewith, in cracks in the microstructure and in solder brittleness, for which reason a maximum content of 0.5 wt. %, preferably less than 0.2 wt. %, in a particularly preferred manner less than 0.05 wt. %, is optionally provided.

Copper Cu: reduces the rate of corrosion and increases the strength.

Contents of above 3 wt. % impair the producibility by forming low melting phases during casting and hot rolling, for which reason a maximum content of 3 wt. %, preferably less than 0.5 wt. %, in a particularly preferred manner less than 0.1 wt. %, is optionally set, Tungsten W: acts as a carbide-forming agent and increases the strength and heat resistance. Contents of W of more than 5 wt. % impair the elongation properties, for which reason a maximum content of 5 wt. % is optionally set. A content of 0.01 wt. % to 3 wt. % is preferred, and 0.2 to 1.5 wt. % is particularly preferred.

Cobalt Co: increases the strength of the steel, stabilises the austenite and improves the heat resistance. Contents of more than 8 wt. % impair the elongation properties. Therefore, the Co content is set to at most 8 wt. %, preferably 0.01 to 5 wt. %, in a particularly preferred manner 0.3 to 2 wt. %.

Zirconium Zr: acts as a carbide-forming agent and improves the strength. Contents of Zr of more than 0.5 wt. % impair the elongation properties. Therefore, a Zr content of 0 to 0.5 wt. %, preferably 0.005 to 0.3 wt. %, in a particularly preferred manner 0.01 to 0.2 wt. %, is set.

Tantalum Ta: tantalum acts in a similar manner to niobium as a carbide-forming agent in a grain-refining manner and thereby improves the strength, toughness and elongation properties at the same time. Contents of over 0.5 wt. % do not provide any further improvement in the properties. Thus, a maximum content of 0.5 wt. % is optionally set. Preferably, a minimum content of 0.005 and a maximum content of 0.3 wt. % are set, in which the grain refinement can advantageously be produced. In order to improve economic feasibility and to optimise grain refinement, a content of 0.01 wt. % to 0.1 wt. % is particularly preferably sought.

Tellurium Te: tellurium improves the corrosion-resistance and the mechanical properties and machinability. Furthermore, Te increases the solidity of manganese sulphides (MnS) which, as a result, is lengthened to a lesser extent in the rolling direction during hot rolling and cold rolling. Contents above 0.5 wt. % impair the elongation and toughness properties, for which reason a maximum content of 0.5 wt. % is set. Optionally, a minimum content of 0.005 wt. % and a maximum content of 0.3 wt. % are set which advantageously improve the mechanical properties and increase the strength of MnS present. Furthermore, a minimum content of 0.01 wt. % and a maximum content of 0.1 wt. % are preferred which render possible optimisation of the mechanical properties whilst at the same time reducing alloy costs.

Boron B: boron delays the austenite conversion, improves the hot-forming properties of steels and increases the strength at room temperature. It achieves its effect even with very low alloy contents. Contents above 0.15 wt. % greatly impair the elongation and toughness properties, for which reason the maximum content is set to 0.15 wt. %. Optionally, a minimum content of 0.001 wt. % and a maximum content of 0.08, preferably a minimum content of 0.002 wt. % and a maximum content of 0.01, is set, in order to advantageously use the strength-increasing effect of boron.

Phosphorus P: is a trace element, it originates predominately from iron ore and is dissolved in the iron lattice as a substitution atom. Phosphorous increases the hardness by means of solid solution hardening and improves the hardenability. However, attempts are generally made to lower the phosphorous content as much as possible because inter alia it exhibits a strong tendency towards segregation owing to its low diffusion rate and greatly reduces the level of toughness. The attachment of phosphorous to the grain boundaries can cause cracks along the grain boundaries during hot rolling. Moreover, phosphorous increases the transition temperature from tough to brittle behaviour by up to 300° C. For the aforementioned reasons, the phosphorus content is limited to values of less than 0.1 wt. %, preferably less than 0.04 wt. %.

Sulphur S: like phosphorous, is bound as a trace element in the iron ore but in particular in the production route via the blast furnace process in the coke. It is generally not desirable in steel because it exhibits a tendency towards extensive segregation and has a greatly embrittling effect, whereby the elongation and toughness properties are impaired. An attempt is therefore made to achieve amounts of sulphur in the melt which are as low as possible (e.g. by deep desulphurisation). For the aforementioned reasons, the sulphur content is limited to values of less than 0.1 wt. %, preferably less than 0.02 wt. %.

Nitrogen N: N is likewise an associated element from steel production. In the dissolved state, it improves the strength and toughness properties in steels containing a higher content of manganese of greater than or equal to 4 wt. % Mn. Lower Mn-alloyed steels of less than 4 wt. % tend, in the presence of free nitrogen, to have a strong ageing effect. The nitrogen diffuses even at low temperatures to dislocations and blocks same. It thus produces an increase in strength associated with a rapid loss of toughness. Binding of the nitrogen in the form of nitrides is possible e.g. by adding titanium or aluminium by alloying, wherein in particular aluminium nitrides have a negative effect upon the deformation properties of the alloy in accordance with the invention. For the aforementioned reasons, the nitrogen content is limited to less than 0.1 wt. %, preferably less than 0.05 wt. %.

What is claimed is:

1. A method for producing a component starting from a medium manganese flat steel product comprising 4 to less than 10 wt. % Mn, 0.0005 to 0.9 wt. % C, 0.02 to 10 wt. % Al, with the remainder being iron including unavoidable steel-associated elements and with a TRIP effect at room temperature, wherein the flat steel product is produced with a microstructure which has an austenite content of 10 to 80%, 20 to 90% martensite, ferrite and bainite, wherein at least 30% of the martensite is present as annealed martensite, said method comprising, the following steps to form the component: pre-heating the flat steel product without deformation to a temperature of 60° C. to 450° C.;
deforming the pre-heated flat steel product by at least one deforming step at a temperature of the flat steel product of 60° C. to 450° C.; and
cooling the deformed flat steel product prior to at least one final deforming step at a temperature of 0° C. to −196° C.

2. The method of claim 1, comprising an additional step of further deforming the cooled steel flat product by one or a plurality of final deforming steps at a temperature of 0° C. to −196° C.

3. The method of claim 1, further comprising pre-heating and/or cooling one side of the flat steel product.

4. The method of claim 1, further comprising pre-heating and/or cooling both sides of the flat steel product.

5. The method of claim 1, further comprising intermediately heating or intermediately cooling the flat steel product during deformation between deformation steps to temperatures, which are selected for the respective deforming steps, between −196° C. to below Ac3.

6. The method of claim 1, wherein the flat steel product is deformed by roil deforming.

7. The method of claim 1, further comprising:
forming the flat steel product into a tube; and
longitudinal seam welding or spiral seam welding the tube; and
forming the tube by internally high-pressure.

8. The method of claim 7, further comprising annealing the formed tube.

9. The method of claim 1, further comprising adding to the flat steel product by alloying, in wt. %:
Si: 0 to 6,
Cr: 0 to 6,
Nb: 0 to 1,
V: 0 to 1.5,
Ti: 0 to 1.5,
Mo: 0 to 3,
Sn: 0 to 0.5,
Cu: 0 to 3,
W: 0 to 5,
Co: 0 to 8,
Zr: 0 to 0.5,
Ta: 0 to 0.5,
Te: 0 to 0.5,
B: 0 to 0.15,
P: less than 0,1,
S: less than 0.1,
N: less than 0.1.

10. The method of claim 1, further comprising coating metallically, inorganically or organically the flat steel product or the component.

* * * * *

UNITED STATES PATENT AND TRADEMARK OFFICE
CERTIFICATE OF CORRECTION

| | |
|---|---|
| PATENT NO. | : 11,519,050 B2 |
| APPLICATION NO. | : 16/333934 |
| DATED | : December 6, 2022 |
| INVENTOR(S) | : Peter Palzer et al. |

It is certified that error appears in the above-identified patent and that said Letters Patent is hereby corrected as shown below:

On the Title Page

Page 2
(56) Foreign Patent Documents:
Replace "RU 117268 A" with the correct -- SU 117268 A --.

In the Claims

In Column 11, Claim 1, Line 7 replace "which has an austenite content of 10 to 80%, 20 to 90% martensite, ferrite and bainite" with -- which has an austenite content of 40 to 80%, 20 to 60% martensite, ferrite and bainite, wherein the total content of ferrrite/bainite in the microstructure is less than 20% and --.

In Column 12, Claim 6, Line 21 replace "roil" with -- roll --.

Signed and Sealed this
Sixth Day of June, 2023

Katherine Kelly Vidal
*Director of the United States Patent and Trademark Office*